Patented Jan. 20, 1953

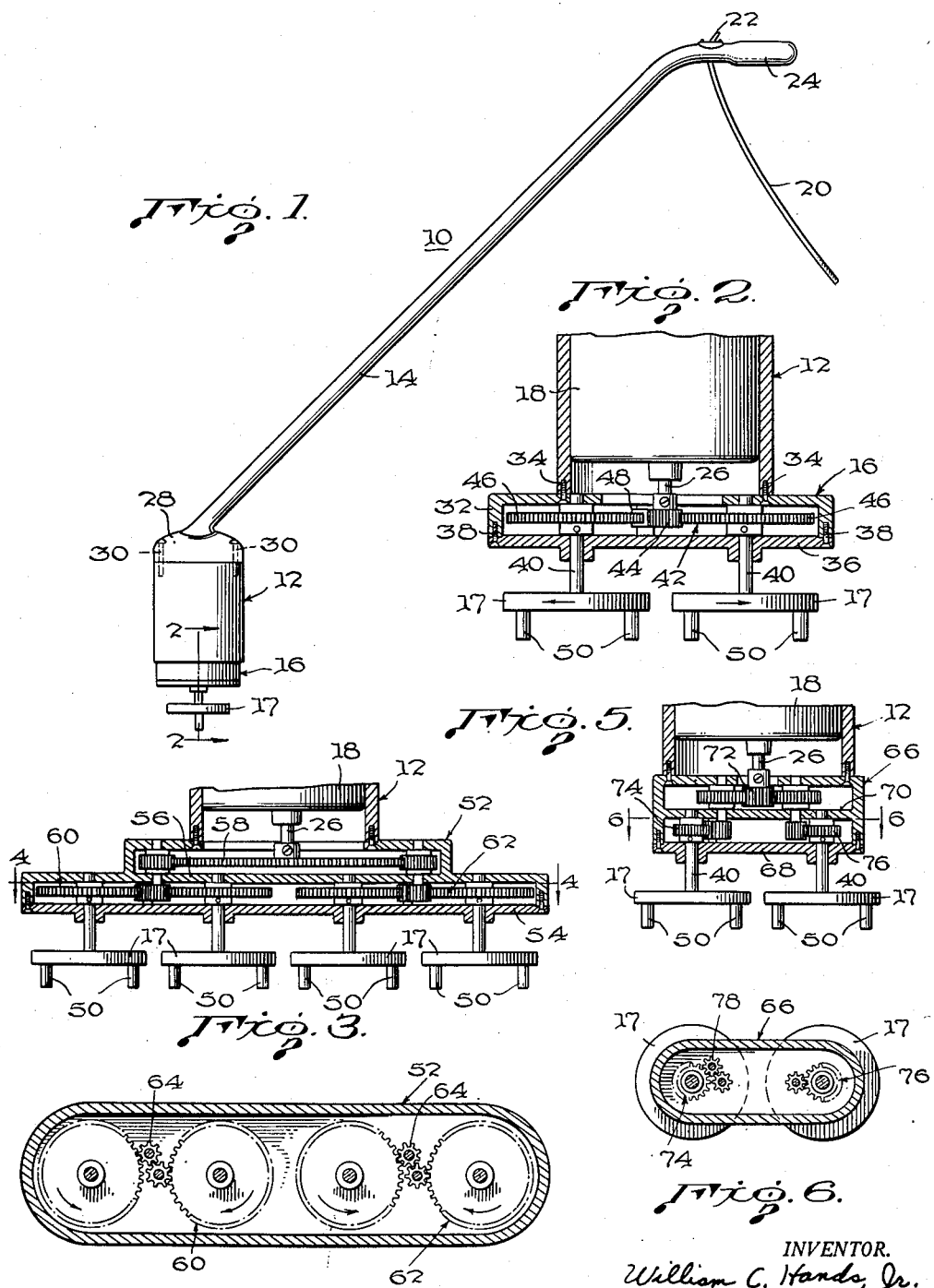

2,625,867

UNITED STATES PATENT OFFICE 2,625,867

PORTABLE WEEDER

William C. Hands, Jr., Rutherford, N. J.

Application March 28, 1949, Serial No. 83,845

1 Claim. (Cl. 97—43)

The present invention relates to improvements in portable weeders for use in small gardens.

Gardening, whether of flowers or vegetables, is almost a universal custom wherever there is a small plot of fertile ground. During the recent war years many vacant lots were converted into productive use by merely plowing, fertilizing and seeding. Much of this land has, of course, returned to its original wild weeded state, but undoubtedly there remains a tremendous enthusiasm for growing plants.

In the past, one of the greatest obstacles to the enjoyment of gardening as a hobby or small business has been the back-breaking problem of weeding. Wherever flowers and vegetables grow, weeds will grow better. It is thus necessary at regular intervals to weed the garden and if a week or two goes by without such action, the weeds choke the growing plants and flowers and may, in time, completely destroy them.

The principal object of my invention is to provide a portable and hand-carried, hand-manipulated, power-operated weeder for use in the small garden found on the typical surburban lot.

A more specific object of my invention is to provide a hand-carried, light weight electric driven weeder having a plurality of oppositely rotated weeder discs that are adapted to engage any weed covered patch and remove the weeds without substantial penetration of the adjacent ground.

A further object of the invention is to provide a unitary power weeder having motor driven weed-engaging surfaces and an extension handle in order that an operator in comfortable erect position may move the weeder to and fro through a small garden to eliminate the weeds without damage to desirable plants and flowers.

These and further objects and advantages residing in my invention will be more apparent from the following description of preferred forms of embodiment thereof taken in connection with the accompanying illustrative drawings in which Fig. 1 is a side elevation of the weeder in operative position;

Fig. 2 is an enlarged vertical section taken on the line 2—2 of Fig. 1 and showing details of the motor mounting and weeder disc drive;

Fig. 3 is an enlarged vertical section similar to Fig. 2 but showing the motor mounting with a modified weeder disc drive;

Fig. 4 is a horizontal sectional view taken on the line 4—4 of Fig. 3;

Fig. 5 is an enlarged fragmentary sectional view showing a further modification of the motor mounting and weeder disc drive; and Fig. 6 is a horizontal section taken on the line 6—6 of Fig. 5.

In accordance with the preferred embodiment of my invention, a portable weeder 10 is shown in Fig. 1 to include a motor housing assembly 12, a supporting and manipulating handle 14 extending angularly upward from the top end of the motor assembly, and a gear driven weeder head 16, carrying rotatable toothed discs 17. The weeder 10 also comprises an electric motor 18 within the housing assembly 12 (Fig. 2), and an electric power supply cord 20 leading to a conventional snap switch 22 adjacent the inward part of a horizontal grip portion 24 of handle 14.

The details of the motor mounting and gear driven weeder discs are best shown in Fig. 2. For commercial reasons it is preferred to use available high speed motors such as are commonly used on hand drills. These low torque motors are not only provided with an internal cooling system which permits operation without serious overheating, but they are light weight, compact and inexpensive. The illustrated motor 18 is of this character and has a driving shaft 26 projecting outwardly from its lower end into an apertured portion of the head or gear box 16. An upper end motor cover 28, preferably integral with the handle 14 is connected by machine screws 30 or other conventional means to the upper end of the housing 12, as indicated in Fig. 1. The weeder head 16 includes a shell part 32 connected by machine screws 34 or the like to the lower end of the motor housing 12. A removable cover and bearing plate 36 is detachably secured to the lower end of the shell 32 by means of a plurality of machine screws 38 or the like.

Each of the pair of weeder discs 17 used in this embodiment has an upstanding shaft 40 supported in the cover and bearing plate 36 in the conventional manner indicated. A conventional speed reducing and reversing gear train 42 positively interconnects the motor shaft 26 in driving relation to the weeder disc shafts 40. The gear train 42 is shown to include a driving pinion 44 rotating with the motor shaft 26 and disposed intermediate a pair of similar reduction gears 46, 46 which drive respective disc shafts 40. The reduction gear 46 on the right of Fig. 2 is directly driven by the pinion 44 but the reduction gear 46 on the left is driven through a reversing idler gear 48 carried by the cover plate 36 in the manner indicated. In this way there is obtained a reduced speed opposite rotation of the closely adjacent pronged discs 17.

Each of the two weeder discs 17 is provided with at least two downwardly projecting teeth or pins 50 extending perpendicularly from the marginal portions thereof. In the preferred embodiment two opposed pins 50 are used on each disc 17, although it will be understood that a greater number of pins may be used if desired. In this embodiment the discs 17 are of the order of 2 inches in diameter for rotation at the relatively low speed of 50 to 200 R. P. M. The pins 50 which may be fixedly secured to the discs 17 in any manner, preferably by screw means for easy replacement, are approximately ⅛ inch in diameter and extend approximately the distance of ¾ inch below the outer face of the respective discs 17. The weeder head 16 is advantageously constructed as a separate assembly carrying the gearing so that it can be readily attached to the motor housing in any suitable manner. A 1/10 horsepower motor has been found sufficient for the purposes indicated. The thus assembled portable weeder weighs between 10 and 14 pounds and can be readily used without fatigue.

It will be noted that the handle 14 is constructed and arranged to facilitate support and manipulation by the two hands of an operator, one of which will grip the portion 24 adjacent the switch 22 and the other of which will support the inclined portion adjacent thereto. For the average adult, a handle having an overall length of 3½ feet has been found most satisfactory. In the preferred embodiment, the upwardly and outwardly extending handle 14 makes an obtuse angle with the axis of the motor shaft 26, while the grip portion 24 extends substantially perpendicular to said axis. While it is preferred to have the oppositely rotating discs 17 disposed on opposite sides of the handle 14, as illustrated, weeder head 16 may be disconnected and turned to a position in which the discs 17 are in line with the handle 14.

As shown in Figs. 1 and 2, and 5 and 6, the shafts of the discs 17 lie in a common plane extending perpendicularly to the plane of the handle 14, and the spaced pair of discs and the gear box 16 or 66 are symmetrically disposed with reference to the plane of said handle.

The modified form of portable weeder construction shown in Figs. 3 and 4 is intended largely for gardens where two pairs of oppositely rotating weeder discs 17 can be used to advantage. In this embodiment a weeder head 52 generally similar to the weeder head 16 previously described in detail, has four in-line weeder discs 17 supported for rotation therein and lying below a removable cover and bearing plate 54. The drive of these four discs 17 from a single motor calls for an intermediate bearing partition 56 in the weeder head 52 for suitably receiving double, reduction and reversing driving gear 58 connected for rotation with the motor shaft 26. The driving gear 58 comprises a conventional pair of reduction gear trains 60, 62 each having a reversing idler 64 (Fig. 4) for producing the desired opposite rotation of the discs 17 of each pair. This four-disc weeder head can be arranged either transversely or in line with the manipulating handle 14. It is relatively wide for coverage, but is so shallow that it can be moved around and behind flowers without damage. A larger size motor is used with this modification.

Figs. 5 and 6 illustrate a further modified weeder head 66 intended to provide greater compactness and less lateral extension of the implement parts. The weeder head 66 which is generally similar to the two embodiments that have been described includes a lower removable cover and bearing plate 68 and an intermediate bearing partition 70. The motor drive shaft 26 carries a pinion gear 72 for driving vertical gear trains 74 and 76 respectively, one of which is provided with a reversing idler 78 in order to obtain the desired opposite rotation of the two toothed discs on prong carriers 17.

The prongs or teeth 50 of each pair of discs 17 are preferably so spaced circumferentially and the discs are connected to the gearing in such angular relation that teeth of each pair come successively into opposed weed gripping relation as the weeder is operated. This preferred arrangement improves the direct weed removing action of the ground-engaging prongs or teeth 50.

The reverse rotation of the gripping pairs of toothed weeder discs 17 is considered essential to the purposes of this invention because it prevents the weeder from walking away from the desired position and thereby makes it easy to handle.

It will thus be seen that there has been provided a portable hand-carried and light weight cultivator that is simple and inexpensive in construction. The novel arrangement and operation of the toothed weeder discs and the motor and gear drive assembly provides a gardening implement which may be used to remove weeds efficiently without damage to plants or undesired penetration of the soil. Undesired scattering of soil is also prevented.

While a preferred embodiment and two modifications of my invention have been shown and described in detail, it will be understood that numerous changes can be made in the construction and arrangement of parts without departing from the principles of such invention and the scope of the appended claim.

Having thus described my invention, what I claim as novel and desire to secure by Letters Patent of the United States is:

A hand-carried portable garden weeder comprising a high speed electric motor having a drive shaft projecting from one end thereof; an upright cylindrical housing receiving the motor, an end cover detachably secured to the housing at the end opposite the drive shaft; a supporting and manipulating handle integrally secured by one end to said end cover and extending upwardly and outwardly thereof at an obtuse angle to the drive shaft, the other end of said handle extending perpendicularly to the drive shaft; a gear box detachably secured to and closing the drive shaft end of the housing; a spaced pair of discs each having a shaft on one face extending into and supported for parallel rotation by the gear box; a gear train in the gear box connected between the motor drive shaft and the shafts of said discs constructed and arranged to drive said discs in opposite directions at the same speed, the shafts of the discs lying in a common plane extending perpendicularly to the plane of the handle, and the spaced pair of discs and the gear box being symmetrically disposed with reference to the plane of the handle; and pin teeth extending perpendicularly from the outer face of each disc at the respective marginal portions thereof, said pin teeth being angularly spaced and arranged to come into opposed weed gripping relation as the discs are driven, whereby weeds may be engaged and removed.

WILLIAM C. HANDS, Jr.

REFERENCES CITED

The following references are of record in the file of this patent:

UNITED STATES PATENTS

| Number | Name | Date |
|---|---|---|
| 74,987 | Butlers | Mar. 3, 1868 |
| 251,784 | Lindsey | Jan. 3, 1882 |
| 325,865 | Sayre | Sept. 8, 1885 |
| 510,143 | Kelsey et al. | Dec. 5, 1893 |
| 841,488 | Doidge | Jan. 15, 1907 |
| 1,728,520 | Wadhams | Sept. 17, 1929 |
| 1,954,579 | Smith | Apr. 10, 1934 |
| 2,050,120 | Pizarro | Aug. 4, 1936 |
| 2,062,820 | Pierce | Dec. 1, 1936 |
| 2,263,431 | White | Nov. 18, 1941 |
| 2,406,013 | Grew | Aug. 20, 1946 |
| 2,411,544 | Kehl | Nov. 26, 1946 |
| 2,528,576 | Brown | Nov. 7, 1950 |

FOREIGN PATENTS

| Number | Country | Date |
|---|---|---|
| 804,046 | France | Oct. 14, 1936 |
| 605,940 | Great Britain | Aug. 4, 1948 |